United States Patent [19]

Lapp et al.

[11] 4,097,912
[45] * Jun. 27, 1978

[54] ELECTRICAL CAPACITOR HAVING AN IMPREGNATED DIELECTRIC

[75] Inventors: John Lapp, Franklin; Fred S. Sadler, Racine, both of Wis.

[73] Assignee: McGraw-Edison Company, Elgin, Ill.

[*] Notice: The portion of the term of this patent subsequent to Jun. 27, 1995, has been disclaimed.

[21] Appl. No.: 542,391

[22] Filed: Jan. 20, 1975

Related U.S. Application Data

[63] Continuation-in-part of Ser. No. 456,867, Apr. 1, 1974, abandoned.

[51] Int. Cl.$^2$ ............................................. H01G 4/22
[52] U.S. Cl. ...................................... 361/318; 252/65; 252/66; 361/315; 361/317
[58] Field of Search .................. 317/258, 259; 252/66, 252/65; 361/314, 317, 318, 315

[56] References Cited

U.S. PATENT DOCUMENTS

| 2,022,634 | 11/1935 | Britton | 317/258 |
|---|---|---|---|
| 2,170,782 | 8/1939 | Clark | 317/258 |
| 2,170,989 | 8/1939 | Coleman | 252/65 |
| 3,746,953 | 7/1973 | Lapp et al. | 317/259 |
| 3,772,578 | 11/1973 | George | 317/258 |
| 3,844,968 | 10/1974 | Jay | 252/66 |

OTHER PUBLICATIONS

"Lapp Affidavit and Attached Exhibits".

*Primary Examiner*—E. A. Goldberg
*Attorney, Agent, or Firm*—Andrus, Sceales, Starke & Sawall

[57] ABSTRACT

An electrical capacitor having an improved dielectric system. The capacitor includes alternate layers of metal foil and polymeric dielectric film which is impregnated with a liquid dielectric composition composed of a mixture of mono-halogenated diphenyl oxide and a mono-halogenated alkyl diphenyl oxide where the alkyl group contains from 1 to 20 carbon atoms in the molecule. In processing the capacitor, the capacitor casing is vacuum dried at room temperature and the dielectric liquid is separately agitated under vacuum to remove gas from the liquid. The degassified liquid is introduced into the casing and the liquid is subjected to a vacuum while maintaining the capacitor at room temperature to impregnate the polymeric layers with the liquid. The capacitor has improved corona characteristics and low dielectric losses, and the liquid dielectric composition is substantially biodegradable.

21 Claims, 5 Drawing Figures

ELECTRICAL CAPACITOR HAVING AN IMPREGNATED DIELECTRIC

This application is a continuation-in-part of application Ser. No. 456,867, filed Apr. 1, 1974 now abandoned, and entitled Electrical Apparatus Having Improved Dielectric System.

BACKGROUND OF THE INVENTION

In the construction of capacitors, such as power factor correction capacitors, the capacitor packs are formed of alternate layers of metal foil and a solid dielectric material which is impregnated with a liquid dielectric.

In the past, Kraft paper tissue was generally used as the dielectric material, and capacitors of this type had relatively high dielectric losses, limiting their use to capacitors having a capacity of 100kvar and below. The combination of paper and polymeric film such as polypropylene film, has also been used as the dielectric layer in capacitors. The paper-film capacitor has substantially lower dielectric losses than the all-paper capacitor and increased reliability, thereby enabling the capacitor to have greater kvar capacity. The paper in the paper-film dielectric layer presents certain limitations, but acts as a wicking material to increase the impregnation of the capacitor pack with the liquid dielectric.

More recently, all-film capacitors have been developed utilizing polypropylene film in combination with polychlorinated diphenyl as the liquid dielectric. All-film capacitors of this type have lower dielectric losses than either the all-paper or paper-film capacitors.

While the polychlorinated diphenyls, such as for example, trichlorodiphenyl, produce an effective dielectric system for a capacitor, their usage has provided certain ecological problems in that the polychlorinated diphenyls are virtually non-biodegradable, with the result that if leakage or rupture occurs in the capacitor casing, or if the capacitor is discarded as obsolete, the polychlorinated diphenyl will remain as a pollutant in the environment and will not degrade to any appreciable extent even over extended periods of many years.

SUMMARY OF THE INVENTION

The invention relates to an electrical capacitor having an improved dielectric system and to a method of processing the capacitor. The capacitor includes alternate layers of metal foil and polymeric dielectric film which is impregnated with a liquid dielectric composition composed of a mixture of a mono-halogenated diphenyl oxide and a mono-halogenated alkyl diphenyl oxide where the alkyl group contains from 1 to 20 carbon atoms in the molecule. The liquid dielectric composition, in general, contains about 5 to 95% by weight of the mono-halogenated diphenyl oxide and 95 to 5% by weight of the mono-halogenated alkyl diphenyl oxide. In addition, the dielectric composition may contain from 0.01 to 10% of an epoxide compound which acts as a scavenger for hydrogen or chlorine atoms generated or released from the impregnant or other materials in the capacitor during its operation.

The solid dielectric flim can take the form of a material such as polypropylene, polyethylene, polyester, or the like, and the surface of the film and/or the contiguous surface of the metal foil is formed with surface irregularities to achieve a wicking action for the liquid dielectric and provide thorough impregnation of the film by the liquid during processing.

In processing or fabricating the capacitor, the capacitor casing containing the polymeric film as the solid dielectric layer is dried under vacuum conditions at a temperature below 60° C and preferably at room temperature for a period of time sufficient to eliminate water vapor and other gases from the interior of the capacitor.

The liquid dielectric is circulated or otherwise agitated under vacuum to remove gases from the liquid. Following the separate degassing of the capacitor and the dielectric liquid, the liquid is introduced into the capacitor. With the capacitor filled, a vacuum is either drawn on the liquid or a superatmospheric pressure is applied to the liquid, while maintaining the capacitor at a temperature below 60° C and preferably at room temperature. After impregnation, the vacuum is released and the capacitor is sealed.

The processing method of the invention eliminates the need for expensive oven heating and provides a substantial improvement in the dielectric characteristics of the capacitor, reducing the dielectric losses and increasing the corona starting voltage and the corona extinction voltage.

As a further advantage, the method of the invention eliminates the need for the post cure which was often necessary when using conventional processing techniques. Eliminating the post cure, which generally required a period of up to 72 hours, substantially shortens the overall processing time for the capacitor thereby reducing manufacturing costs.

The capacitor of the invention exhibits low dielectric losses and has superior corona characteristics over the temperature range of −40° to +120° C. As a further advantage, the liquid dielectric composition is generally biodegradable, with the result that the composition will decompose into harmless compounds if exposed to the atmosphere through leakage or rupture of the casing and there are no determined adverse effects on the environment.

The dielectric system, if processed according to the invention to eliminate gases from the dielectric system, is capable of operating under electrical stress at elevated temperatures up to 125° C without degradation of the polymeric layers or the liquid dielectic. The increased stability at elevated temperatures enables the dielectric system to be used in large power factor correction capacitors which generally have an operational temperature range (case temperature) of −40° to +50° C, as well as in smaller ballast or specialty capacitors that may be subjected to operational temperatures up to 100° C.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
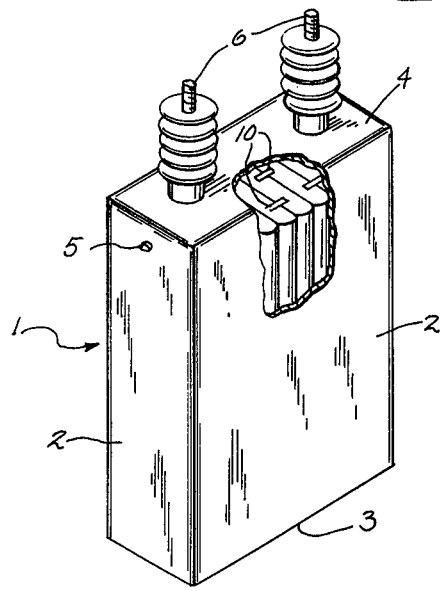
FIG. 1 is a perspective view of a typical capacitor constructed in accordance with the invention.

FIG. 1 illustrates a typical capacitor comprising an outer casing 1 having side walls 2, a bottom wall 3, and a cover 4. In service, the casing 1 is hermetically sealed and is provided with a small sealed hole 5 through which the dielectric liquid is introduced into the casing during fabrication. In addition, a vacuum line can be connected to hole 5 for vacuum drying of the capacitor during fabrication. A pair of terminals 6 project through the cover and are insulated from the cover.

Figure 2:
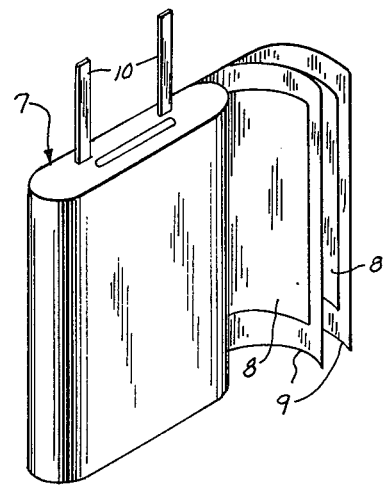
FIG. 2 is a perspective view of a capacitor pack.

A series of capacitor packs 7 are disposed within the casing 1 and each capacitor pack, as illustrated in FIG. 2, includes wound layers of metal foil 8 separated by a dielectric layer 9. Electrodes 10 are connected to the foil layers 8 and the electrodes of the various packs are connected together in series for final connection to the terminals 6.

The foil layers 8 may be formed of any desired electrically conductive material, generally a metallic material such as aluminum, copper, or the like. The layers 8 may be in the form of flat sheets, or the layers can be provided with surface irregularities, such as a series of deformations formed by indentations on one side of the foil and corresponding elevations on the other side, as disclosed in U.S. Pat. No. 3,746,953.

The solid dielectric layers 9 are composed of polymeric film such as polypropylene, polyehtylene, polyester, or polycarbonate. The dielectric layers 9 can take the form of smooth-surfaced strips or can take the form of a polymeric strip, such as polypropylene, having a layer of fine polyolefin fibers adhering to the surface, as disclosed in U.S. Pat. No. 3,772,578. The term "all film" as used in the description, means that the dielectric layers 9 are formed of all polymeric materials, but it is possible that other components of the capacitor could be formed of paper or non-polymeric materials which would also be impregnated with the liquid dielectric composition.

It is important that the surface of the polymeric film 9 and/or the contiguous surface of the metal foil 8 have surface irregularities or deformations so that the two contiguous surfaces are not in continuous intimate contact. The surface irregularities provide a wicking or capillary effect for the liquid dielectric, enabling the liquid to thoroughly impregnate the film 9 during processing.

The polymeric film layers 9 are impregnated with a liquid dielectric composition which consists of a mixture of mono-halogenated diphenyl oxide and a mono-halogenated alkyl diphenyl oxide, with the alkyl group containing from 1 to 20 carbon atoms.

The mono-halogenated diphenyl oxide is employed in the mixture in an amount of about 5 to 95% by weight, with the mono-halogenated alkyl diphenyl oxide comprising the balance. For most applications, the mono-halogenated diphenyl oxide is employed in an amount of 10 to 70% by weight of the composition, with the balance being the mono-halogenated alkyl diphenyl oxide.

In both components, chlorine is preferred as the halogen although other halogens, such as bromine, may be utilized. The halogen atom is usually located at the para position in each compound and in the typical process for preparing the compounds about 80 to 100% of the halogen atoms are in the para position, while the remaining 0 to 20% are in the ortho position.

The alkyl group in the mono-halogenated alkyl diphenyl oxide preferably contains 3 to 16 carbon atoms and can either be a branch chain or a straight chain, and the particular position and number of branches is not critical to the invention.

Specific examples of the dielectric composition to be used in the capacitor of the invention in weight percent are: 50% mono-bromodiphenyl oxide and 50% mono-chlorododecyldiphenyl oxide; 30% mono-chlorodiphenyl oxide and 70% mono-chlorododecyldiphenyl oxide; 80% mono-chlorodiphenyl oxide and 20% mono-chlorohexyldiphenyl oxide; 40% mono-chlorodiphenyl oxide and 60% mono-chlorotetradiphenyl oxide; 20% mono-chlorodiphenyl oxide and 80% mono-chloropropyldiphenyl oxide; 35% mono-chlorodiphenyl oxide and 65% mono-chlorohexyldiphenyl oxide; 17% mono-chlorodiphenyl oxide and 83% mono-chlorotetradiphenyl oxide.

The dielctric composition can also include from 0.01 to 10% by weight, and preferably from 0.2 to 1.5% by weight, of an epoxide scavenger which will act to neutralize decomposition products that are released from or generated from the liquid impregnant and other materials in the capacitor during its operation. The neutralizing agents or scavengers can take the form of 1,2,-epoxy-3-phenoxypropane; bis(3,4-epoxy-6-methylcyclohexylmethyl) adipate; 1-epoxyethyl-3,4-epoxycyclohexane; 3,4-epoxycyclohexylmethyl-3,4-epoxycyclohexanecarboxylate; 3,4-epoxy-6-methylcyclohexylmethyl-3,4-epoxy-6-methylcyclohexanecarboxylate; and mixtures thereof. The epoxide compoun-s are effective to rapidly neutralize decomposition products, thereby improving the dielectric properties and service life of the capacitor.

The mono-halogenated diphenyl oxide can be prepared by conventional processes in which diphenyl oxide is halogenated by use of an aluminum halide, such as auluminum chloride, or other protonic acids to produce a mixture of o- and p- halodiphenyl oxide, as described in U.S. Pat. No. 2,022,634.

Similarly, the mono-halogenated alkyl dipehnyl oxide can be prepared by known techniques in which a halodiphenyl oxide is treated with a small proportion of aluminum chloride after which an alkyl halide or an olefin is gradually introduced while maintaining the mixture at a reaction temperature as disclosed in U.S. Pat. No. 2,170,989.

No special procedures are required for mixing the two components together and they are miscible at room temperature or elevated temperatures. Alternately, the mixture can be obtained through the alkylation process in which the alkylation is terminated at a time sufficient to obtain the desired ratio of the mono-halogenated alkyl diphenyl oxide and the mono-halogenated diphenyl oxide. When using this method to obtain a lower alkyl alkylation, some small percentage of di-alkylation may occur.

To process the capacitor of the invention, the interior of the capacitor casing containing the capacitor pack is initially subjected to a vacuum or subatmospheric pressure for a period of time sufficient to remove water vapor and other gases from the interior of the capacitor. The vacuum is drawn out on the interior of the casing 1 by a line connected between a vacuum header and the hole 5. A vacuum less than 100 microns, and preferably below 30 microns, is normally employed, and a vacuum drying period of longer than 40 hours is customary although the time period depends on the magnitude of the vacuum.

To prevent molecular expansion of the polymeric film, the temperature should be maintained below 60° C and the vacuum drying is preferably carried out at a temperature below 43° C, such as room temperature. The polymeric film layers 9 are impregnated with the liquid dielectric by means of diffusion in which the molecules of the liquid dielectric enter the film and migrate from regions of high concentration to regions of low concentration until equilibrium is achieved. If has been found that heating of the polymeric film adversely effects the rate of diffusion due to the expansion of the molecular structure by heating, so that it is important to avoid heating the polymeric film layers to a temperature above 60° C during the drying of the capacitor.

The liquid dielectric is separately subjected to a vacuum drying treatment to remove gases from the dielectric liquid. To provide the degassing treatment, a vacuum less than 500 microns is utilized, with a vacuum less than 50 microns being preferred. The liquid is subjected to the vacuum drying for a period of time sufficient to remove gases from the liquid. To accelerate the degassing, it is preferred to agitate the liquid either by circulating the liquid or subjecting it to a stirring or mixing action. The time of degassing depends of various factors, such as the viscosity of the liquid, the magnitude of the vacuum, the type of agitation and other factors. In general, the gas is subjected to the vacuum drying treatment for a period in excess of 12 hours.

During the vacuum drying treatment the liquid is preferably maintained at room temperature. Heating can be used, but the degassed liquid should be at a temperature of below 60° C and preferably below 43° C when introduced into the capacitor. The degassed liquid dielectric is introduced into the capacitor casing 1 through the line attached to hole 5 while maintaining the vacuum. After filling of the capacitor casing, a vacuum of less than 100 microns and preferably less than 30 microns, is maintained on the liquid for a period of time sufficient to thoroughly impregnate the solid dielectric layers with the liquid dielectric. For most operations an impregnation period in excess of 24 hours is utilized. During this period the temperature of the solid dielectric layers 9 in the capacitor and the dielectric liquid are maintained less than 60° C, and preferably at a temperature below 43° C, such as room temperature.

Alternately, after filling, a positive pressure in the amount of 1 to 4 psig can be applied to the liquid dielectric in the capacitor to aid in impregnation of solid polymeric layers. The pressure is normally maintained on the liquid dielectric for a period in excess of 30 minutes. The manner of applying the pressure to the liquid is not critical although it is preferred not to utilize a pressurized gas in direct contact with the liquid for the gas may be absorbed in the liquid, and the absorbed gas could have adverse effects on the dielectric properties of the system.

Following the impregnation or soaking period, the vacuum, or pressure, if used, is released and the capacitor is sealed.

In the past, a post cure operation was often utilized in which the sealed capacitor was heated to a temperature of about 85° C for a period of up to 72 hours to improve the impregnation and obtain better reliability. The post curing operation is not required with the method of the invention, although the incorporation of the post curing could be employed without adverse results, but it would substantially increase the overall processing time. By eliminating the post cure, a substantial reduction in the time of processing is achieved and this is important from a production standpoint.

It has been found that the liquid dielectric composition used in the capacitor of the invention will more readily impregnate the polymeric film than conventional impregnants, such as trichlorodiphenyl. This increase in the rate of impregnation is related to the surface energy of the composition and is also dependent, at least in part, on the relatively low viscosity of the composition. An increase in the rate of impregnation can result in a substantial time saving in fabrication of the capacitor.

The liquid dielectric composition is substantially fully biodegradable, meaning that if the dielectric composition should be exposed to the environment because of leakage or rupture of the casing, or through discarding of obsolete capacitors, the liquid dielectric will readily decompose into harmless compounds and there will be no significantly adverse environmental effect.

Figure 3:
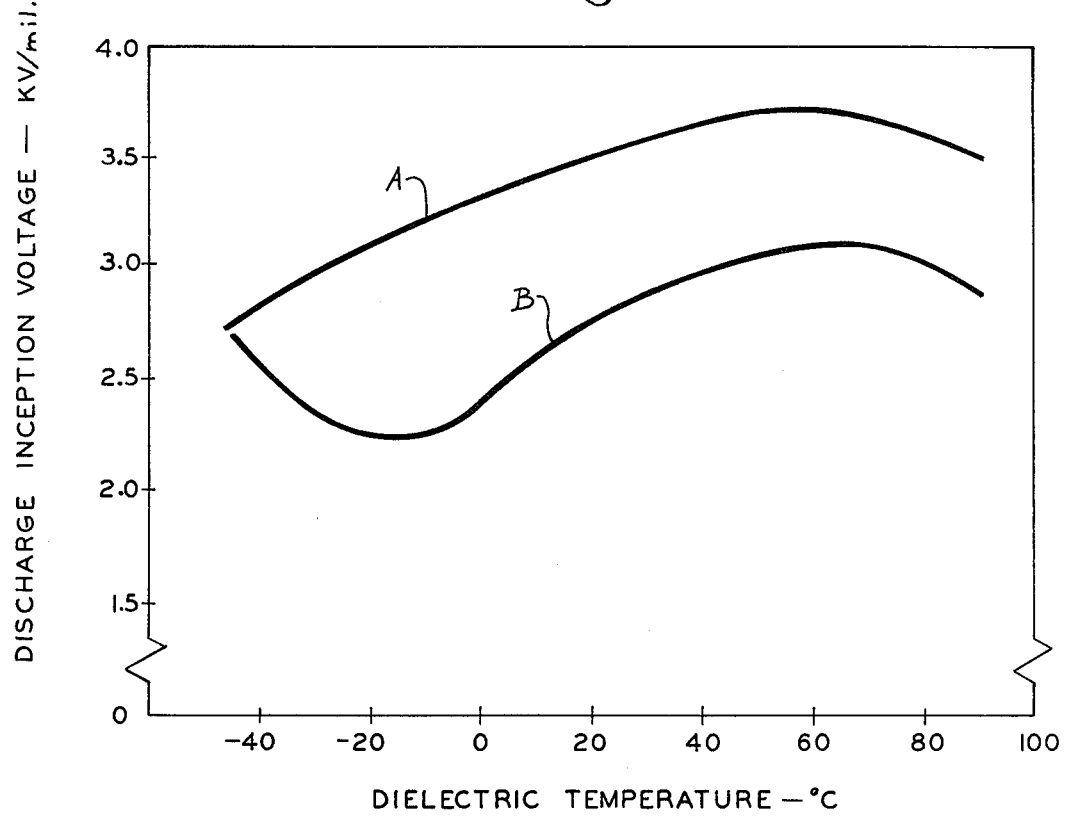
FIG. 3 is a graph showing the discharge inception voltage at various temperatures of capacitors made in accordance with the invention as compared to a capacitor using a chlorinated diphenyl as the impregnant.

A capacitor utilizing the dielectric composition of the invention has excellent partial discharge characteristics as illustrated in FIG. 3. FIG. 3 compares the average discharge inception voltage (DIV) of a series of small capacitors made in accordance with the invention with similar small capacitors using trichlorodiphenyl as the impregnant. In FIG. 3, curves A, B and C represent the DIV of capacitor samples using as the liquid dielectric 20% by weight mono-chlorodiphenyl oxide and 80% by weight of mono-chloropropyldiphenyl oxide, 35% by weight of mono-chlorodiphenyl oxide and 65% by weight of mono-chlorohexyldiphenyl oxide, and 50% by weight mono-chlorodiphenyl oxide and 50% by weight of mono-chlorododecyldiphenyl oxide, respectively, while curve D represents the DIV of capacitor samples using trichlorodiphenyl as the liquid dielectric. All of the capacitor samples included 0.5% by weight of bis(3,4-epoxy-6-methylcyclohexylmethyl) adipate as a scavenger.

All of th capacitor samples included two sheets of polypropylene film as the solid dielectric having a nominal thickness of about 0.0005 and deformed aluminum foil having a nominal sheet thickness of 0.00025. The polypropylene film and the foil were wound convolutely in packs and placed in steel casings which were vacuum dried in an oven at 70° F for 120 hours at a vacuum of 20 microns. The dielectric liquid in each case was separately vacuum degassed at 70° F for 48 hours at a vacuum of below 50 microns. The dielectric liquids were admitted to the casings and held at a temperature of 70° F for 96 hours while maintaining a vacuum of below 20 microns on the liquids. After this period of soaking, the vacuum was released on each sample and the capacitor was sealed.

The capacitor samples in all cases, were operated under conditions of electrical stress at room temperature for a period of more than 1000 hours at 1800 volts per mil. After this operational period, the DIV was determined at various temperatures from −40° to +90° C.

The curves in FIG. 3 show that the sample capacitors of the invention (Curves A, B and C) have a higher DIV over the entire temperature range than do the sample capacitors using the trichlorodiphenyl as the impregnant (curve D). Furthermore, the characteristic dip at about −20° to 0° C which is exhibited by the capacitors samples using trichlorodiphenyl is not present in the samples impregnated with the dielectric composition of the invention.

These tests illustrate that the capacitor of the invention can be constructed to have a DIV greater than 1.5 kv/mil at all temperatures from −40° to +90° C.

The increased DIV of the capacitor of the invention is important in that it provides an increased safety margin, insuring that the normal operational stress will be well below the corona voltage. Conversely, the improved corona characteristics of the capacitor of the invention over conventional capacitors, such as those using trichlorodiphenyl, will permit an increase in the number of volts per mil without a sacrifice in the ratio of DIV to operating stress.

It has been found that the DIV of a capacitor incorporating the mixture of the mono-halogenated diphenyl oxide and the mono-halogenated alkyl diphenyl oxide is substantially higher throughout the entire operating temperature range than the DIV of similar capacitors using the individual liquid dielectric components, and this phenomenon is unexpected and unobvious. As an example, a set of capacitor samples having two sheets of 0.0005 inch polypropylene film as the dielectric layer and impregnated with mono-chlorodiphenyl oxide (without additives) had a DIV of about 2.50 kv/mil at 20° C. Under the same conditions a similar set of capacitor samples impregnated with mono-chlorododecyldiphenyl oxide (without additives) has a DIV of about 2.30 kv/mil, while a similar set of capacitor samples under the same conditions and using a 50:50 by weight combination of mono-chlorodiphenyl oxide and mono-chlorododecyldiphenyl oxide (without additives) had a DIV of about 3.00 kv/mil. Thus, the mixture of the two components produces a substantial improvement in the corona characteristics of the capacitor, as compared to the individual components and this result is unobvious and unexpected.

Figure 4:
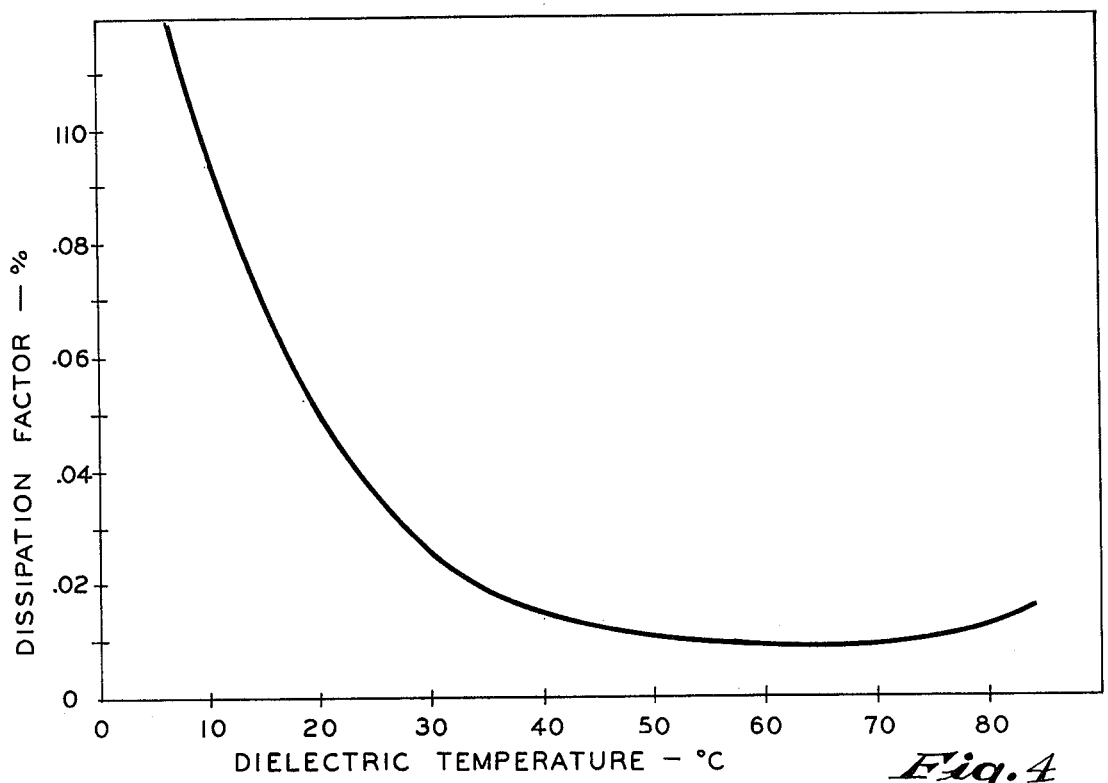
FIG. 4 is a graph showing the dissipation factor of a capacitor made in accordance with the invention at various temperatures.

FIG. 4 is a curve showing the dissipation factor of a full sized power factor correction capacitor having a dielectric layer composed of 2 sheets of polypropylene film, having a nominal thickness of about 1.5 mils, impregnated with a mixture of 50% mono-chlorodiphenyl oxide and 50% mono-chlorododecyldiphenyl oxide and containing 0.3% by weight of 1,2,epoxy-3-phenoxypropane as a scavenger. The readings were taken at rated voltage of about 1200 volts per mil, and, in accordance with standard procedure, the unit was stabilized at temperature and energized only long enough to take the reading. As shown by the curve, the dissipation factor is very low at room temperature and above, and is comparable to the dissipation factor of all-film capacitors impregnated with trichlorodiphenyl.

To illustrate the ability of the capacitor of the invention to operate under stress at elevated temperatures, six prototype ballast capacitors were constructed using deformed aluminum foil having a nominal sheet thickness of 0.00025 inch, two sheets of 0.0005 inch polypropylene film as the solid dielectric and a 50:50 weight ratio of mono-chlorodiphenyl oxide and mono-chlorododecyldiphenyl oxide as the liquid dielectric.

The capacitor casings containing the wound layers of foil and film were placed in an open top pan in an autoclave and a vacuum of 20 microns was drawn on the autoclave for 120 hours to remove air from the casings. The dielectric liquid was separately degassed under a vacuum of 50 microns for 48 hours at room temperature (20° C). The degassed liquid was then introduced into the pan to submerge the casings while maintaining the vacuum, and the capacitors were soaked at room temperature for 96 hours while maintaining a vacuum of below 50 microns on the liquid. After this period of soaking, the vacuum was released and each sample capacitor was sealed.

The prototype ballast capacitors were tested at 105° C for 100 to 200 hours starting at 400 volts/mil, up to 1300 volts/mil at 100 volts/mil increments. None of the prototypes exhibit partial discharges during the testing, and after testing at 1300 volts/mil at 105° C the dissipation factors of the prototypes were in the range of 0.04 to 0.07%. These tests illustrate the exceptional high temperature properties of the capacitor making it particularly suitable for ballast and specialty capacitors where the operational temperatures can be up to 120° C. These tests are significant in that all-film capacitors using polychlorinated diphenyl as the impregnant cannot be operated under the above stress conditions and temperatures without substantial degradation of the film.

Figure 5:
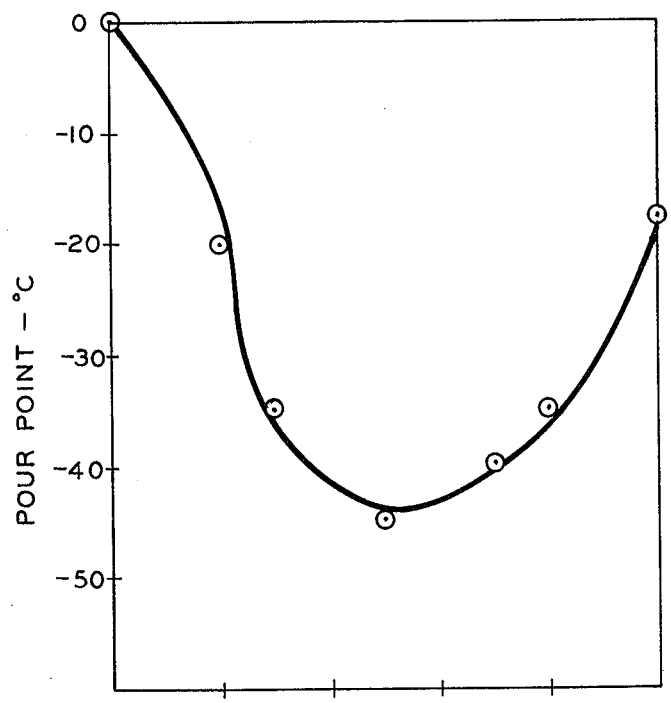
FIG. 5 is a graph showing the pour point of the mixture of various ratios of mono-chlorodiphenyl oxide and mono-chlorododecyl diphenyl oxide.
Figure 5:
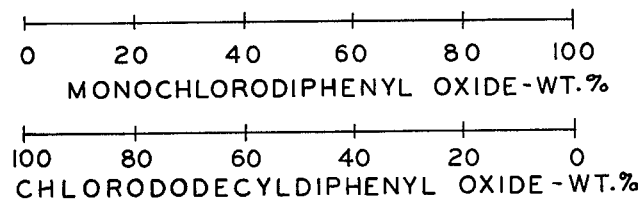

The curve in FIG. 5 illustrates pour point data of various mixtures of mono-chlorodiphenyl oxide and mono-chlorododecyldiphenyl oxide which was obtained under test conditions where the temperature was stabilized for several hours before readings were taken. As shown in this curve, the pour point of chlorododecyldiphenyl oxide alone is about 0° and the crystallization point of mono-chlorodiphenyl oxide alone is approximately −18° C. However, contrary to expectations, a mixture of the two has a pour point lower than either of the individual components. For example, the pour point of a 50:50 mixture of the two components is approximately −45° and for most mixtures the pour point is well below −20° C.

As capacitors may be subjected to extremely low ambient temperatures in use, it is desirable that the dielectric liquid have a low pour point. The depressed pour point provided by a mixture of the two components insures that the liquid dielectric will not crystalize and will be in a liquid state throughout the entire operating temperature range of the capacitor.

The capacitor made in accordance with the invention has a relatively high DIV over the entire operating temperature range, thereby providing good corona characteristics, and exhibits low dielectric losses. The higher DIV results in an increased safety margin, insuring that the volts per mil will be well below the DIV, or alternately permitting an increase in the volts per mil without a decrease in the safety margin.

The capacitor of the invention, if subjected to abnormal stress conditions resulting in a breakdown of the dielectric system, has reduced gassing characteristics, thereby minimizing the internal pressures and producing a safer, more reliable unit.

The dielectric system is capable of operating under electrical stress at temperatures in excess of 100° C without deterioration of the polymeric film or the dielctric liquid.

As the components of the liquid dielctric composition are mono-halogenated, the composition is biodegradable, and while the composition has a burn point, it will not burn as readily as other conventional dielectrics such as mineral oil and vegetable oils.

The method of processing the capacitor provides improved impregnation of the polymeric film, thereby shortening the overall processing time, and eliminating the need for the conventional post cure operation.

Various modes of carrying out the invention are contemplated as being within the scope of the following claims particularly pointing out and distinctly claiming the subject matter which is regarded as the invention.

We claim:

1. An electrical capacitor, comprising a sealed casing, a capacitor pack in the casing and having a pair of electrically conductive strips and a pair of dielectric layers wound alternately to form the capacitor pack, and a dielectric liquid composition impregnating said dielectric layers, said dielectric composition comprising a mixture of a mono-halogenated diphenyl oxide and a mono-halogenated alkyl diphenyl oxide where the alkyl group contains from 1 to 20 carbon atoms in the molecule, and said dielectric layers being composed of polymeric film said capacitor having a high discharge inception voltage over its normal operating temperature range.

2. The capacitor of claim 1, wherein the mono-halogenated diphenyl oxide is present in the amount of 5 to 95% by weight of the mixture and the mono-halogenated alkyl diphenyl oxide is present in an amount of 95 to 5% by weight of the mixture.

3. The capacitor of claim 1, wherein said dielectric layers and said strips have contiguous surfaces, at least one of said contiguous surfaces having a plurality of surface irregularities to provide interupted contact between said contiguous surfaces.

4. The capacitor of claim 3, wherein the dielectric layers are composed of polyolefin film and a layer of fine fabrous polyolefin is attached to a surface of said film to provide said surface irregularities.

5. The capacitor of claim 3, wherein the strips are formed of metal foil and said surface irregularities comprise a plurality of deformations formed by indentations on one surface of the foil and corresponding elevations on the opposite surface of said foil.

6. The capacitor of claim 4, wherein the polyolefin is polypropylene.

7. The capacitor of claim 3, wherein said dielectric layers are composed of polypropylene film and said dielectric composition comprises a mixture of 5 to 95% by weight of mono-chlorodiphenyl oxide and 95 to 5% by weight of mono-chlorododecyldiphenyl oxide.

8. The capacitor of claim 1, wherein the dielectric composition has a pour point below −20° C.

9. The capacitor of claim 1, wherein the composition includes an epoxide scavenger in an amount of 0.01 to 10% by weight of said mixture and said epoxide scavenger is selected from the group consisting of 1,2-epoxy-3-phenoxypropane; bis(3,4-epoxy-6-methylcyclohexylmethyl) adipate; 1-epoxyethyl-3,4-epoxycyclohexane; 3,4-epoxycyclohexylmethyl-3,4-epoxycyclohexanecarboxylate; 3,4-epoxy-6-methylcyclohexylmethyl-3,4-epoxy-6-methylcyclohexanecarboxylate; and mixtures thereof.

10. The capacitor of claim 1, wherein the halogen of said mono-halogenated diphenyl oxide is bromine and the halogen of said mono-halogenated alkyl diphenyl oxide is chlorine.

11. The capacitor of claim 1, wherein said capacitor has a discharge inception voltage greater than 1.5 kv/mil at all temperatures from −40° to +90° C.

12. An electrical capacitor comprising a sealed casing, a capacitor pack in the casing and having a pair of electrically conductive strips and a pair of dielectric layers of polymeric film wound alternately to form the capacitor pack and a dielectric liquid composition impregnating said dielectric layers, said dielectric composition comprising a mixture of 5 to 95% by weight of a mono-halogenated alkyl diphenyl oxide where the alkyl group contains from 1 to 20 carbon atoms in the molecule and 95 to 5% by weight of mono-halogenated diphenyl oxide, said dielectric layers and said strips have contiguous surfaces, at least one of said contiguous surfaces having a plurality of surface irregularities to provide interupted contact between said contiguous surfaces, said capacitor having a discharge inception voltage greater than 1.5 kv/mil at all temperatures from −40° to +90° C.

13. The capacitor of claim 12, wherein at least one of the halogens is chlorine.

14. The capacitor of claim 12, wherein the halogen of said mono-halogenated diphenyl oxide is bromine and the halogen of said mono-halogenated alkyl diphenyl oxide is chlorine.

15. The capacitor of claim 12, wherein the composition includes an epoxide scavenger in an amount of 0.01 to 10% by weight of said mixture; said epoxide scavenger is selected from the group consisting of 1,2-epoxy-3-phenoxypropane; bis(3,4-epoxy-6-methylcyclohexylmethyl)adipate; 1-epoxyethyl-3,4-epoxycyclohexane; 3,4-epoxycyclohexylmethyl-3,4-epoxycyclohexanecarboxylate; 3,4-epoxy-6-methylcyclohexylmethyl-3,4-epoxy-6-methylcyclohexanecarboxylate; and mixtures thereof.

16. The capacitor of claim 12, wherein said polymeric film is selected from the group consisting of polypropylene, polyethylene and polyester.

17. The capacitor of claim 12, wherein said alkyl group contains from 3 to 16 carbon atoms.

18. An electrical capacitor, comprising a sealed casing, a capacitor pack in the casing and having a pair of electrically conductive strips and a pair of polymeric layers wound alternately to form the capacitor pack, and a dielectric liquid composition impregnating said dielectric layers, said dielectric layers composed of polypropylene and said dielectric compostion being a mixture of mono-chlorodiphenyl oxide and mono-chlorododecyldiphenyl oxide, said mixture having a pour point less than −20° C, and said capacitor having a discharge inception voltage greater than 1.5 kv/mil at all temperatures from −40° to +90° C.

19. The capacitor of claim 1, wherein the mono-halogenated alkyl diphenyl oxide is mono-chloropropyldiphenyl oxide.

20. The capacitor of claim 1, wherein the mono-halogenated alkyl diphenyl oxide is mono-chlorobutyldiphenyl oxide.

21. The capacitor of claim 1, wherein the mono-halogenated alkyl diphenyl oxide is mono-chlorohexyldiphenyl oxide.

* * * * *

UNITED STATES PATENT AND TRADEMARK OFFICE
CERTIFICATE OF CORRECTION

PATENT NO. : 4,097,912
DATED : June 27, 1978
INVENTOR(S) : JOHN LAPP ET AL

It is certified that error appears in the above-identified patent and that said Letters Patent are hereby corrected as shown below:

Column 1, Line 64, Cancel "flim" and substitute therefor ---film---, Column 5, line 2, Cancel "out", Column 5, line 17, Cancel "If" and substitute therefor ---It---, Column 6, Line 48, Cancel "th" and substitute therefor ---the---, Column 8, line 25, Cancel "usng" and substitute therefor ---using---, Column 8, line 35, Cancel "0°" and substitute therefor ---0°C---, Column 8, line 42, Cancel "-45°" and substitute therefor --- -45°C ---, Column 9, line 38, CLAIM 4, Cancel "fabrous" and substitute therefor ---fibrous---

Signed and Sealed this

Third Day of April 1979

[SEAL]

Attest:

RUTH C. MASON
Attesting Officer

DONALD W. BANNER
Commissioner of Patents and Trademarks